United States Patent [19]

Hembree

[11] Patent Number: 5,525,214

[45] Date of Patent: Jun. 11, 1996

[54] FILTER CARTRIDGE FOR WATER TREATMENT DEVICE

[75] Inventor: Richard D. Hembree, Edina, Minn.

[73] Assignee: Recovery Engineering, Inc., Minneapolis, Minn.

[21] Appl. No.: 298,044

[22] Filed: Aug. 30, 1994

Related U.S. Application Data

[63] Continuation-in-part of Ser. No. 207,380, Mar. 8, 1994.

[51] Int. Cl.[6] .................................................. B01D 27/10
[52] U.S. Cl. .......................... 210/88; 210/91; 210/100; 210/282; 210/435; 210/460; 222/14; 222/16; 222/20
[58] Field of Search ............................... 210/87, 91, 100, 210/282, 435, 88, 460; 222/14, 16, 20

[56] References Cited

U.S. PATENT DOCUMENTS

| | | |
|---|---|---|
| 4,172,796 | 10/1979 | Corder . |
| 4,379,053 | 4/1983 | Brane . |
| 4,489,616 | 12/1984 | Priddy . |
| 4,681,677 | 7/1987 | Kuh et al. . |
| 4,686,037 | 8/1987 | Lang . |
| 4,698,164 | 10/1987 | Ellis . |
| 4,769,135 | 9/1988 | Norton . |
| 4,770,768 | 9/1988 | Lang . |
| 4,772,386 | 9/1988 | Grout et al. . |
| 4,918,426 | 4/1990 | Butts et al. . |
| 5,050,772 | 9/1991 | Brane et al. . |
| 5,065,901 | 11/1991 | Brane et al. ............................. 210/100 |
| 5,089,144 | 2/1992 | Ozkahyaoglu et al. . |
| 5,099,870 | 3/1992 | Moore et al. . |
| 5,254,242 | 10/1993 | van der Meer et al. ............... 210/282 |

FOREIGN PATENT DOCUMENTS

| | | |
|---|---|---|
| 0537528A1 | 4/1993 | European Pat. Off. . |
| 4094708 | 3/1992 | Japan . |
| 2093005 | 8/1982 | United Kingdom . |

*Primary Examiner*—Robert A. Dawson
*Assistant Examiner*—Kenneth M. Jones
*Attorney, Agent, or Firm*—Merchant, Gould, Smith, Edell, Welter & Schmidt

[57] ABSTRACT

A water filter cartridge including an outer shell, an inlet opening proximate a first end, an outlet opening and a cam extending axially from the first end. Cam is constructed and arranged so as to reset a mechanical flow totalization mechanism in a water treatment device. A channel and notch in the first end of the cartridge provide fluid communication to a chamber of a water treatment device.

7 Claims, 5 Drawing Sheets

FILTER CARTRIDGE FOR WATER TREATMENT DEVICE

This application is a continuation-in-part of application Ser. No. 08/207,380, filed Mar. 8, 1994.

FIELD OF THE INVENTION

This invention relates generally to water treatment devices, and more particularly to devices incorporating mechanisms for end-of-life indication, automatic shutoff, resetting the automatic shutoff and bypass, and to a filter cartridge for water treatment devices.

BACKGROUND OF THE INVENTION

Water treatment devices for home and other use are well known in the art. Such devices are incorporated into a water system either in-line or at a terminal end. An example of the former would be an under-the-counter device which filters water prior to reaching the faucet. There are two common types of terminal end devices—countertop and faucet-mounted. As compared to countertop and under-the-sink devices, designing a faucet-mounted device presents special challenges. These include making the device sufficiently light so that it can be attached to a faucet and sufficiently compact so that the device does not take up valuable sink space.

Water treatment devices can treat water by the use of mechanical filtration or chemical treatment. Mechanical filters treat water by preventing passage of particulates. As a mechanical filter approaches the end of its useful life, reduced or stopped flow due to particulate accumulation provides a ready indication that element replacement is necessary. By contrast, when the capacity of a chemical element is exceeded, there is no such indication. Chemical treatment is accomplished by processes such as adsorption (e.g. charcoal media) and ion exchange (e.g. for lead removal). Such chemical treatment eventually degrades and becomes inactive. However, no indication is provided to the user that the water is no longer being treated by the media.

As a result, various approaches have been taken to indicate end of life to the user where it is not inherently provided by the behavior of the filter media. One example is shown in U.S. Pat. No. 4,686,037. In this approach, a pre-filter is used to entrap contaminants, and the color of the pre-filter is compared by the user with a reference strip to determine when the media requires replacement. The problem with this approach, however, is that it is inherently subjective, and therefore subject to error. Also, the user can easily forget to check the reference filter and mistakenly believe the media is still purifying when it is not.

A much more accurate and foolproof means of indicating end of life is through totalizing the volume which has passed through the media and automatically shutting off flow after a predetermined volume has passed through the device. Although the flow totalization and shutoff valve mechanisms required are relatively expensive and complex, this has become recognized as the most accurate means of indicating end of life. For example, the certifying agency in the United States for water treatment devices, the National Sanitation Foundation, requires for certification of a rated volume, twice the filter media capacity when an automatic shutoff is not used, and only 20% additional capacity when an automatic shutoff is employed.

Both electrical and mechanical approaches to flow totalization are known in the prior art. Examples of the former are shown in U.S. Pat. Nos. 4,918,426 and 5,089,144. In this approach, flow rate is measured by, for example, a pressure transducer and then integrated to calculate total volume. After a predetermined volume has been reached, a valve is electrically actuated to stop flow.

Examples of mechanical totalization in water treatment devices are shown in U.S. Pat. Nos. 4,681,677 and 4,698,164. In the mechanical approach, typically a turbine powered by water flowing through the device is interconnected with a series of gears which mechanically "add up" the volume of water which has passed through the device. In turn, the gearing mechanism is interconnected with a valve such that, after a predetermined volume of water has passed through the device, the valve is mechanically actuated to stop flow through the device.

However, prior art mechanical automatic shutoff mechanisms suffer from certain shortcomings. One problem is that the mechanisms employed, such as in the '677 patent, are too bulky to be included in a compact device. Another problem with prior art devices is that they make resetting the totalization and shutoff mechanism unnecessarily difficult and/or expensive. For example, to reset the device shown in the '677 patent, one would apparently have to manually release the valve from the rotating cam and manually disengage the gearing mechanism to reset the totalization mechanism to a zero volume position. In the '164 patent, the valve shutoff mechanism is incorporated into the replaceable cartridge, and the shutoff valve is connected to the gearing mechanism upon replacement of the cartridge. This approach is unnecessarily wasteful and expensive because the shutoff valve is thrown away with each cartridge, rather than being reused.

With respect to faucet-mounted water treatment devices, it is not known in the prior art to incorporate automatic shutoff end-of-life indication. This is due at least in part to the obstacles associated with incorporating a mechanical flow totalization and shutoff mechanism in the required compact size. As a result, prior art devices have employed much cruder forms of end-of-life indication, such as that discussed above in the '037 patent. Not only are prior art end-of-life indicating devices much less accurate, but they are also unnecessarily wasteful due to the more frequent cartridge replacement often required by certification standards.

A feature that is common to faucet-mounted devices is the ability to bypass or divert water from the filter media so that untreated water can be obtained from the faucet. This is desirable because it avoids unnecessary use of the filter media, allowing the user to bypass the water treatment device if the water is not intended for drinking, as for example for washing hands or dishes.

Such a bypass mechanism is shown in the '037 patent. In this approach, a separate handle is attached to the opposite end of the mounting member to control a bypass valve. Other prior art devices use this same approach, and therefore suffer from certain disadvantages. The separate handle adds unnecessary complexity and expense to manufacturing a bypass mechanism. Also, because of the environment in which faucet-mounted devices are employed, there is a significant problem with keeping such devices clean. A separate handle only makes this more difficult, adding increased surface area and creating difficult-to-clean crevices. Finally, the added handle makes the appearance of the device less appealing, which is a particularly important concern for faucet-mounted devices.

What has been needed is a compact, low-cost and easy-to-manufacture water treatment device having an automatic shutoff mechanism which is easy to reset. What has also been needed is a faucet-mounted device incorporating automatic shutoff and a simple bypass mechanism.

What has also been needed is a replacement filter cartridge which can reset the flow totalization and shutoff mechanism upon replacement of the cartridge and which provides a simple water flow path and efficient sealing in communication with the water treatment device.

SUMMARY OF THE INVENTION

According to the present invention, a water treatment device having a replaceable filter cartridge is provided. The filter cartridge can include mechanical or chemical filter media or a combination thereof.

In one aspect of the invention, the water treatment device includes an arrangement comprising a mechanism for mechanically totalling the volume of water that has been filtered and a mechanism for indicating when the replaceable filter cartridge has reached the end of its useful life. End of life indication is provided by a valve mechanism for stopping flow after a predetermined volume has been filtered. The arrangement also comprises a mechanism for resetting the flow totalization mechanism, including a spring. The spring is connected with and biased by the flow totalization mechanism, and a mechanism for releasing the spring to reset the flow totalization mechanism is included. The spring can be any of a variety of mechanical springs which would be suitable for this purpose, including for example torsional, coil, leaf, and helical springs in either compression or tension.

In another aspect of the invention, the water treatment device includes an arrangement comprising a shutoff valve which closes to stop flow after a predetermined volume of water has passed through the cartridge. The arrangement further includes a spring which is loaded when the shutoff valve closes and a release arm which causes the spring to unload and force the shutoff valve open during replacement of the filter cartridge.

In another aspect of the invention, the water treatment device includes an arrangement comprising a mechanism for mechanically totalling the volume of water that has been filtered and a mechanism for indicating end of life by stopping flow after a predetermined volume has been filtered. A shutoff valve mechanism is permanently contained within the device such that it is not replaced upon replacement of the filter cartridge. The arrangement also comprises a mechanism for resetting the flow totalization mechanism, which includes a mechanism for resetting by replacement of the filter cartridge.

The reset mechanisms of the present invention can be employed not only in terminal-end water treatment devices, such as faucet-mounted and counter-top, but also in in-line devices, such as under-the-counter.

In another aspect of the invention, the water treatment device comprises a faucet-mounted device. The faucet-mounted device comprises a mechanism for indicating end of life by stopping flow of water through the filter cartridge after a predetermined volume of water has been filtered through the device.

In yet another aspect of the invention, the water treatment device comprises a faucet-mounted device with a novel flow-bypass design. The faucet-mounted device comprises a housing with a filter element contained therein and having inlet and outlet openings. A mounting member includes inlet and outlet ports, with the inlet port being attachable to the faucet. A valve is in operable connection with the mounting member and the housing and includes first and second flow channels. The first flow channel extends between the inlet port and the inlet opening, and the second flow channel extends between the inlet and outlet ports. The valve body is rotatable with respect to the mounting member between first and second flow positions. In the first flow position, water flows from the inlet port, through the first flow channel, into the inlet opening of the housing, through the filter element and out the outlet opening of the housing. In the second flow position, water flows from the inlet port, through the second flow channel and out the outlet port of the mounting member. Therefore, by rotation of the housing, water is diverted from passing through the housing to passing through the mounting member.

Also according to the present invention, a water filter cartridge for use in a water treatment device is provided. In one aspect of the invention, the water filter cartridge comprises an outer shell containing water treatment material and having a central axis. The filter cartridge further comprises an inlet opening proximate a first end of the outer shell, an outlet opening proximate a second end, and a cam extending axially from the first end of the outer shell. When the filter cartridge is replaced, the cam resets the flow totalization mechanism upon either insertion or withdrawal of the cartridge (or both).

In another aspect of the invention, the water filter cartridge comprises an outer shell, a radially displaced inlet opening proximate a first end, and a generally coaxial outlet opening proximate a second end. A channel and a notch in the first end are in fluid communication with one another so as to provided a flow path whereby water flows from the channel, through the notch, through a chamber of the water treatment device, into the inlet opening of the filter cartridge and out the outlet opening.

In yet another aspect of the invention, the water filter cartridge comprises an outer shell containing water treatment material and having a longitudinal axis, an inlet opening and an outlet opening. An actuating projection extends from the outer shell generally parallel to the longitudinal axis of the outer shell. When the filter cartridge is replaced, the actuating projection resets the flow totalization mechanism upon either insertion or withdrawal of the cartridge (or both).

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
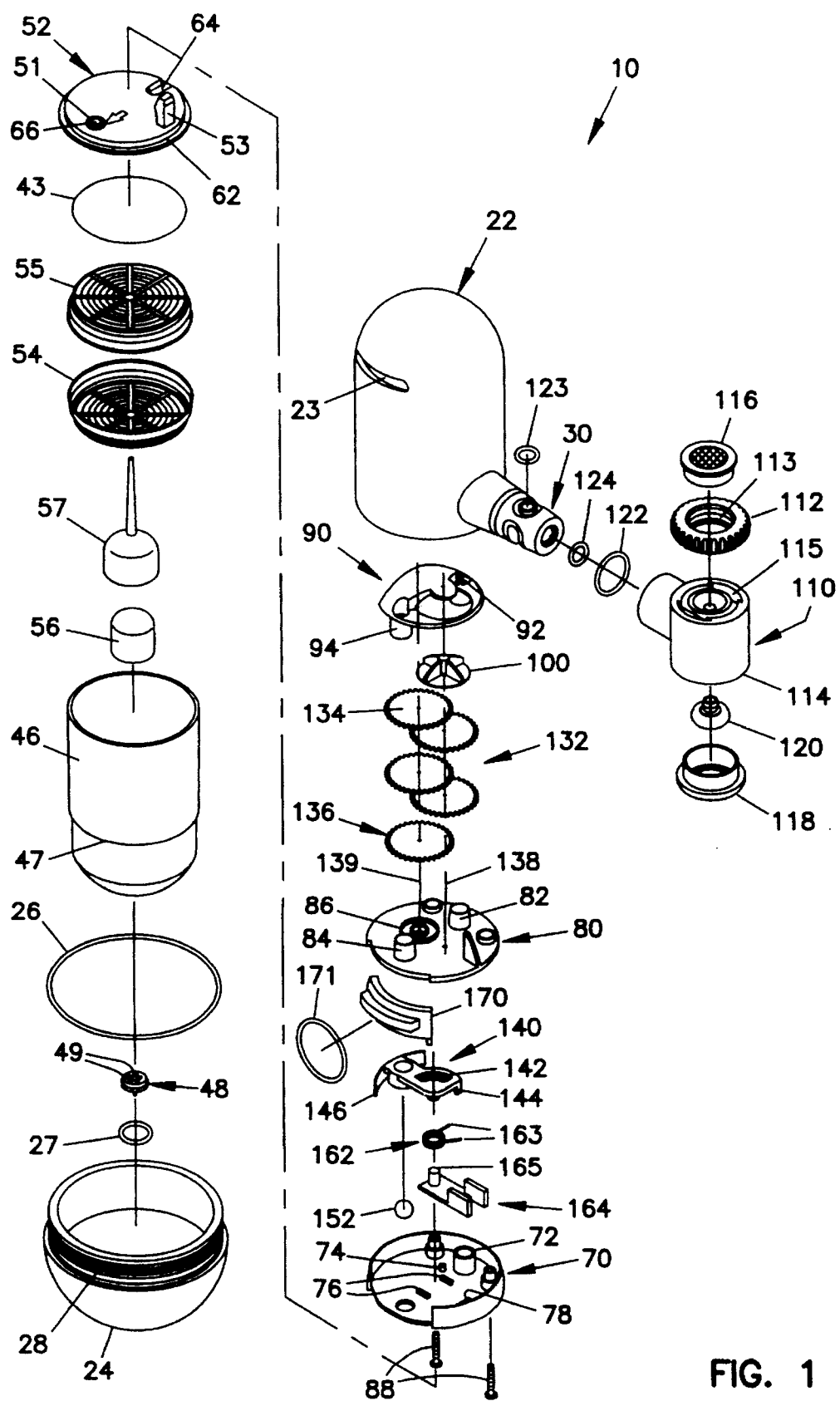
FIG. 1 is an exploded perspective view of a water treatment device according to the present invention.

Referring now to the drawings wherein like numerals designate like parts, a faucet-mounted water treatment device 10 is shown in FIGS. 1–8. Although water treatment device 10 is faucet mounted, many of the novel features disclosed herein can be incorporated into in-line or countertop devices as well.

Figure 2:
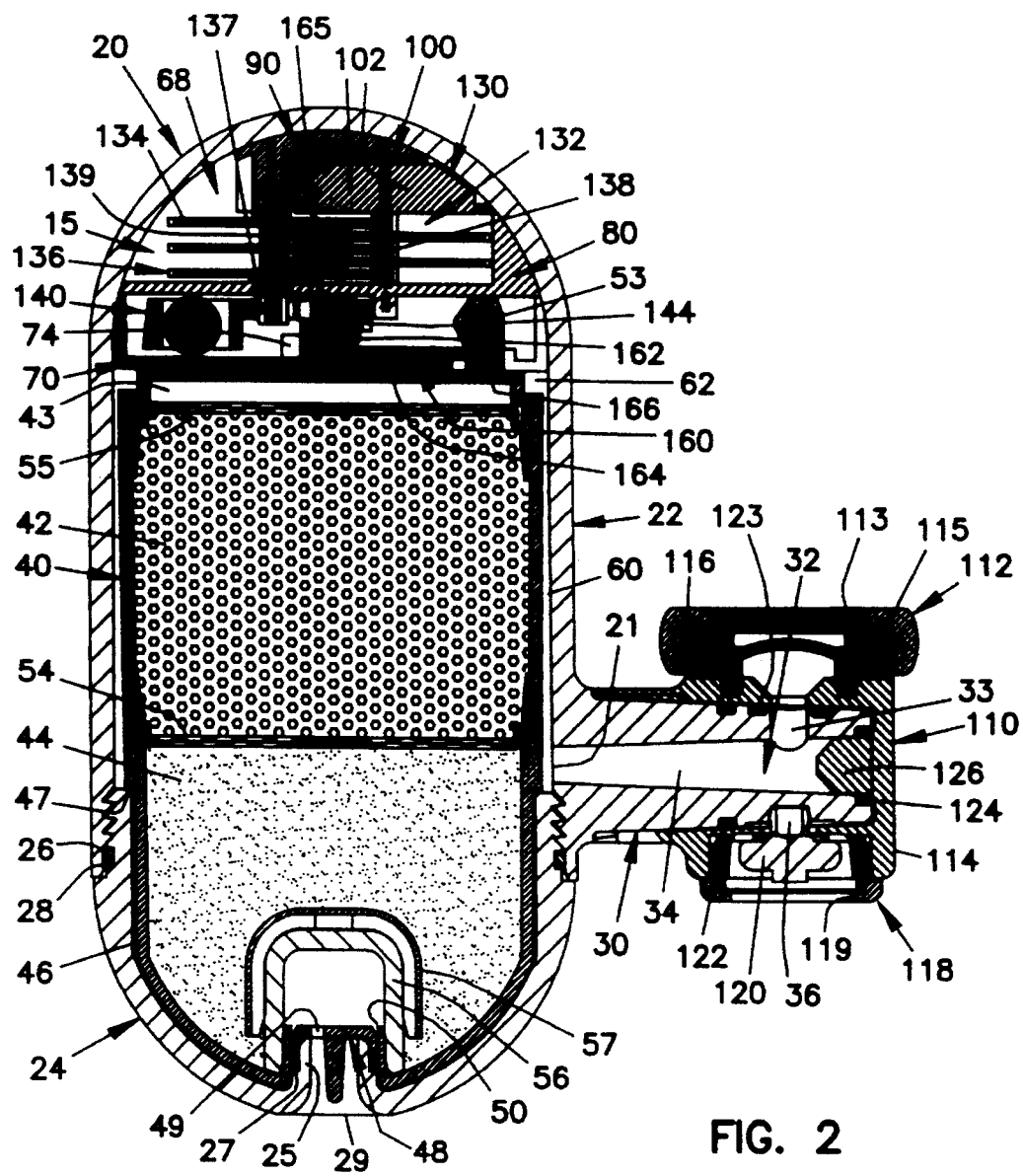
FIG. 2 is a cross-sectional view of the water treatment device shown in FIG. 1 as viewed generally from Section 2—2 of FIG. 4.

Referring to FIGS. 1 and 2, water treatment device 10 includes housing 20 which comprises upper portion 22 and cap 24 which threads into upper portion 22. First O-ring 26 is provided in channel 28 to create a watertight seal between upper portion 22 and cap 24. Replaceable filter cartridge 40 is inserted into upper portion 22 from below, and cap 24 is threaded to upper portion 22 to secure cartridge 40 in housing 20.

Figure 3:
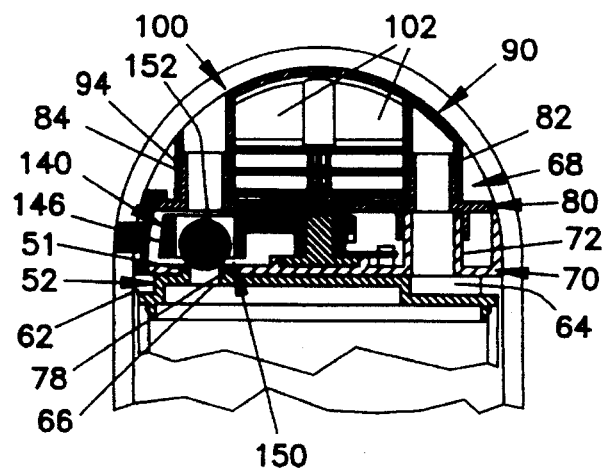
FIG. 3 is a partial cross-sectional view of the water treatment device shown in FIG. 1 as viewed from Section 3—3 of FIG. 5.

Water flows through housing 20 and cartridge 40 as follows. Water enters housing 20 from valve body 30 at inlet opening 21 and fills annular space 60 between cartridge 40 and housing 20, including peripheral annular channel 62 formed in top 52 of cartridge 40. As best shown in FIGS. 1 and 3, water then flows from channel 62, into notch 64 of top 52 and up through cylindrical portions 72, 82 of lower 70 and upper 80 plates, respectively. Water is then directed out of jet 92 of top plate 90 (best shown in FIG. 1) to turn blades 102 of turbine 100. Turbine 100 is tightly nested in top plate 90, as best shown in FIG. 2, with minimum clearance between blades 102 and top plate 90 to maximize turbine efficiency. Water exits turbine 100 and passes through exit cylinder 94 of top plate 90, which extends over second cylindrical portion 84 of upper plate 80.

In normal operation (i.e. when flow has not been "shut off"), water then flows into cartridge 40 through inlet opening 66 in top 52. While water primarily flows as described due to the arrangement of the various parts, it should be understood that water also fills chamber 68 generally defined between lower plate 70 up to upper portion 22 of housing 20. Water flows through cartridge 40 by passing through filter disc 43, second screen 55, first media 42, first screen 54, second media 44, and post filter 56, respectively, and then out through holes 49 in retainer 48. Water then exits housing 20 from outlet opening 29. It will be understood that outlet opening 29 could take on various configurations and could be from various positions in housing 20, although it is preferable that opening 29 be from bottom of housing 20.

Mounting member 110 is used to mount water treatment device 10 to a faucet (not shown). Adapter nut 112 defines inlet port 113 and is connected to body 114 by screen 116, which is shouldered by adaptor nut 112 and sealingly held in annular channel 115 of body 114. Aerator 118 and aerator nub 120 are inserted into body 114 from below, with aerator 118 defining outlet port 119. Mounting member body 114 extends over valve body 30, and they are sealed together by third 122, fourth 123 and fifth 124 O-rings. Fifth O-ring 124 surrounds extension 126 of body 14, which extends into axial channel 34 of valve body 30. Axial channel 34 is preferably tapered for ease of manufacturing by injection molding.

Valve body 30 is rotatable within mounting member 110 between two flow positions to allow the user to bypass cartridge 40 if desired. In the first flow position shown in FIG. 2, water flows from inlet port 113, through first flow channel 32 defined by radial 33 and axial 34 channels and into inlet opening 21 of housing 20. In the second flow position shown in FIGS. 7 and 8, water flows from inlet port 113, through C-shaped second channel 36 and out outlet port 119 of mounting member 110. It will be understood by those skilled in the art that first 32 and second 36 channels can be configured in a variety of other ways to achieve the result of diverting flow by rotation of housing 20. It will also be understood that it is not required that valve body 30 be molded as a single part with upper portion 22 of housing 20 as in the preferred embodiment, although it is required that valve body 30 be fixedly connected to housing 20.

Water treatment device 10 includes an arrangement 15 for indicating the useful life remaining in replaceable filter cartridge 40. Arrangement 15 includes flow totalization mechanism 130 and shutoff valve mechanism 150. It will be understood by those skilled in the art that a variety of totalization 130 and valve 150 mechanisms could be employed within the scope of the present invention to achieve the same purpose. Arrangement 15 also includes reset mechanism 160 for resetting totalization 130 and valve 150 mechanisms. In the preferred embodiment reset mechanism 160 includes biased spring 162 which is released by insertion of cartridge 40. However, it will be understood by those skilled in the art that spring 162 could be released by other means. It will also be understood that totalization 130 and valve 150 mechanisms could be reset by a variety of other mechanisms responsive to insertion of cartridge 40 which do not incorporate a spring.

In the preferred totalization mechanism 130, turbine 100 is connected with a plurality of gears 132 which in turn are connected with a rotating sector 140. It will be understood that turbine 100 need not be directly connected to first gear 134 and that sector 140 need not be directly connected to last gear 136. Gears 132 are successively interconnected, with each having a 10-to-1 ratio in the preferred embodiment. Turbine 100 and two gears 132 are stacked on first pin 138, and the remaining three gears 132, including first 134 and last 136 gears are stacked on second pin 139. Pins 138, 139 are held in place from above by upper portion 22 of housing 20. From below, first pin 138 is inserted into a hole in upper plate 80, and second pin 139 is held in place by last gear 136, which extends through and is seated on raised portion 86 of upper plate 80.

Figure 4:
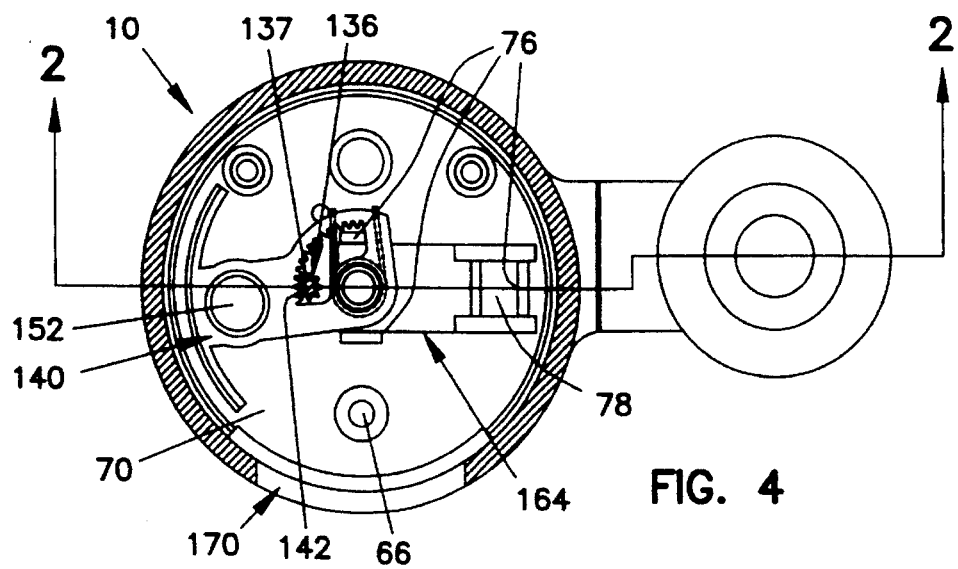
FIG. 4 is a top partial cross-sectional view of the flow shutoff mechanism of the present invention, with the mechanism in the zero volume position.
Figure 5:
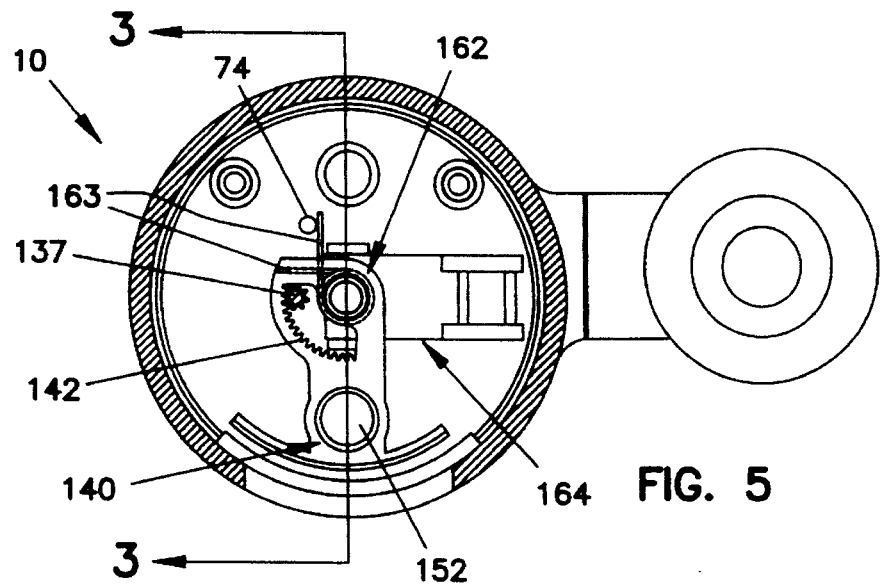
FIG. 5 is a top partial cross-sectional view of the flow shutoff mechanism of the present invention, with the flow shutoff mechanism at the end-of-life position.

Last gear 136 is connected to sector 140 by pinion 137 of last gear 136 engaging teeth 142 of sector 140, as best shown in FIGS. 4 and 5. Thus, as turbine 100 rotates, gears 132 are successively rotated, causing sector 140 to be rotated by pinion 137 and thereby "adding up" the volume of water that has passed through cartridge 40.

The preferred shutoff valve mechanism 150 includes ball 152, which is held by and rotated with sector 140, and flow inlet opening 66 of filter cartridge 40. Shutoff mechanism 150 starts in a zero volume position, as shown in FIGS. 2 and 4. After totalization mechanism 130 has rotated sector 140 to the flow stop position, as shown in FIGS. 3 and 5, ball 152 becomes seated in inlet opening 66 of cartridge 40, which is formed by raised portion 51 of top 52 extending through lower plate 70. It will be understood by those skilled in the art that a variety of other suitable mechanical valve mechanisms could also be employed.

Figure 6:
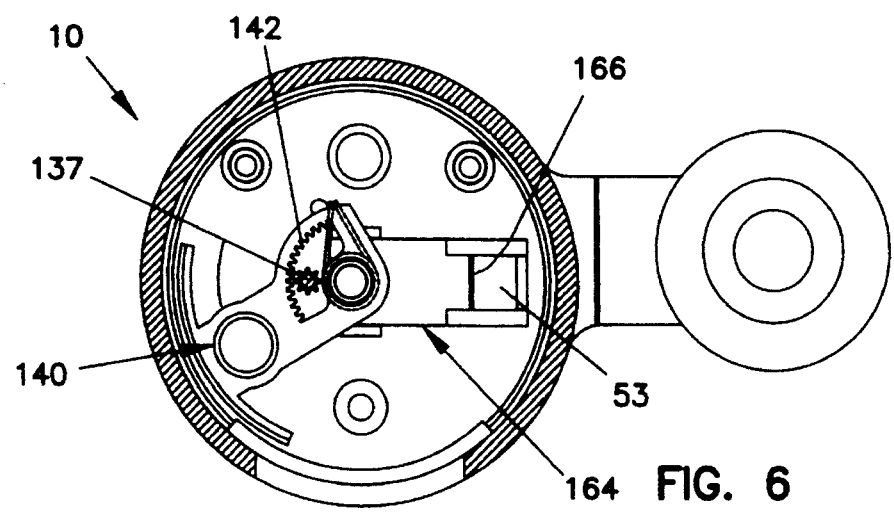
FIG. 6 is a top partial cross-sectional view of the flow shutoff mechanism of the present invention, with the flow shutoff mechanism in an intermediate position and the reset mechanism of the present invention activated.
Figure 8:
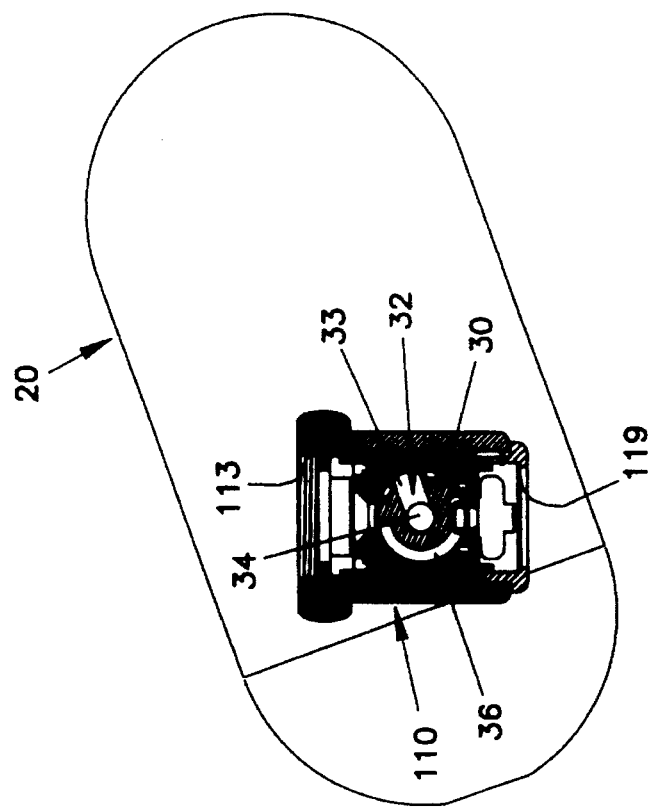
FIG. 8 is an end cross-sectional view of the flow-bypass mechanism shown in FIG. 7 as viewed from Section 8—8 of FIG. 7.
Figure 7:
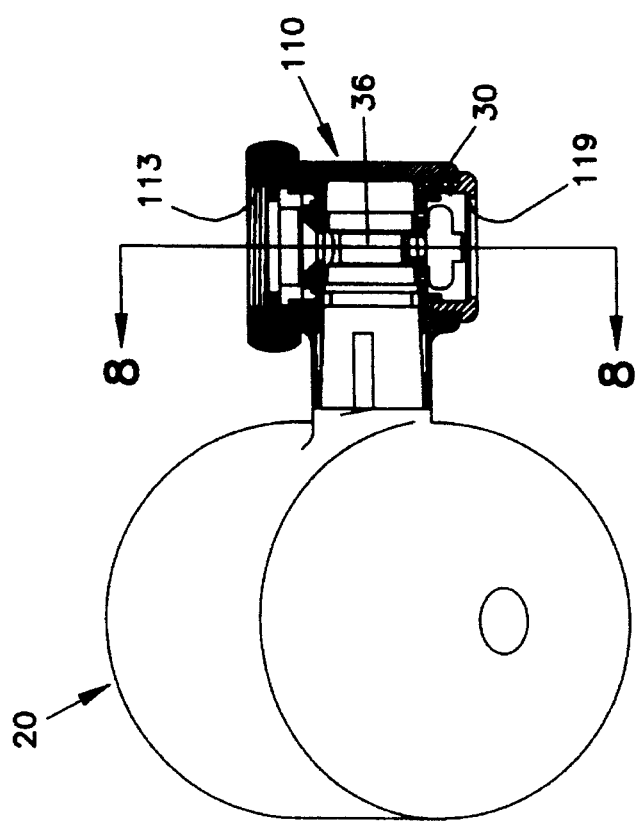
FIG. 7 is a cross-sectional view of a bypass mechanism according to the present invention, with the flow diverted through the mounting member.

Reset mechanism 160 includes spring 162 which is connected to and wound by sector 140 as sector 140 rotates. It will be understood that, while the preferred embodiment employs a wound coil spring 162, numerous other types of springs as discussed hereinabove and a variety of other arrangements and connections could be employed whereby a spring is biased by a flow totalization mechanism. To release spring 162 in the preferred embodiment, pinion 137 is radially disengaged from teeth 142 of sector 140, thereby causing sector 140 to be rotated back to the zero volume position by spring 162, as shown in FIG. 6. It will be understood that teeth 142 and pinion 137 could also be separated axially to achieve the same result.

In the preferred embodiment, spring 162 is released by a transverse movement of slide 164 acting as a release arm. Slide 164 includes vertical extension 165 onto which sector 140 and spring 162 are rotatably mounted. Spring 162 includes levers 163 extending from opposite ends, with one of levers 163 abutting stop 144 on sector 140 and the other lever 163 abutting fixed stop 74 on lower plate 70. This arrangement allows spring 162 to serve both the functions of resetting sector 140 and returning slide 164 to its unslid position because spring 162 resists torsional movement of sector 140 as well as transverse movement of slide 164. Slide 164 is held in line by guides 76 on lower plate 70. The components between upper 80 and lower 70 plates are held together by screws 88 inserted from below, as shown in FIG. 1.

In the preferred embodiment, slide 164 is slid by insertion and removal of filter cartridge 40. It will be understood that slide 164 could be moved in a variety of other ways, such as by pushing a button to reset totalization mechanism 130. It will also be understood that totalization mechanism 130 could also be reset by a variety of other mechanisms which are responsive to replacement of cartridge 40. For example, a mechanism could be constructed such that insertion of cartridge 40 causes last gear 136 to axially separate from sector 140, or that causes separation and turning of sector 140 without use of a spring 164.

In the preferred arrangement, slide 164 is slid by cam 53 projecting axially from top 52 of cartridge 40, thus actuating reset mechanism 160. When cartridge 40 is axially inserted into housing 20, cam extends through opening 78 in lower plate 70 and abuts cam follower surface 166 on slide 164 to move slide 164 transversely. Those skilled in the art will recognize that cam 53 need not necessarily be a separate projection, but can form part of for example an inlet or outlet opening projecting from the cartridge to actuate reset mechanism 160. Cam 53 includes a double sloping facade facing radially inwardly. Although cam 53 can take on a variety of other shapes, in the preferred embodiment the sloped facade is generally symmetric. As a result, slide 164 is slid transversely both upon insertion and removal of cartridge 40. Necessarily therefore, while totalization mechanism 130 in normal operation will already be returned to a zero volume position upon removal of cartridge 40, the mechanism 130 is "reset" through transverse movement of slide 164 by both insertion and withdrawal of cam 53 in the preferred design. Within the principles of the invention, however, the cam could be designed so as to reset the flow totalization mechanism upon either insertion or removal or both.

In addition to providing a flow stop indication of end of life, a continuous visual indication of the amount of useful life remaining in replaceable filter cartridge 40 is provided in the preferred embodiment. This is accomplished by colored screen 146 at the end of sector 140, which is visible through lens 170 as sector 140 rotates. Referring to FIG. 1, lens 170 is inserted into slot 23 of upper portion 22 of housing 20, and is sealed by gasket 171.

In the preferred embodiment, cartridge 40 comprises two chemical filter media, including first media 42, which comprises an ion exchange resin suitable for removing lead, and second media 44, which comprises Granular Activated Charcoal ("GAC"). Mechanical or other chemical filter media can also be employed within the scope of the invention in various numbers or combinations. In the preferred cartridge 40, media 42, 44 are enclosed by base 46, O-ring retainer 48 which is friction fit with an inwardly extending cylindrical portion 50 of base 46, and top 52 which is friction fit with an inner side of the upper portion of base 46. Base 46 includes shoulder 47 which is supported by cap 24 to push cartridge 40 upwardly into housing 20. Retainer 48 holds second O-ring 27 in place to create a seal between retainer 48, cylindrical portion 50 and inward extension 25 of cap 24. Water exits cartridge 40 through holes 49 in retainer 48.

Within cartridge 40, filter media 42, 44 (not shown in FIG. 1) are separated by first screen 54, and second screen 55 separates first media 42 from filter disc 43 which is held between top 52 and second screen 55. Filter disc 43 is made of white filter paper and is for the purpose of providing the user with a visual reference to assure the user that cartridge 40 is performing its function and to indicate whether a particular cartridge has been used. In the preferred embodiment, top 52 is clear so that the user can see if disc 43 has gathered contaminants, indicating that the cartridge 40 has been used. U-shaped post filter 56 extends over cylindrical portion 50 to prevent GAC from being flushed out, and post filter cap 57 extends over filter 56 to direct the flow of water to bottom of cartridge 46 to assure that the entire second media 44 is utilized.

Water flows through cartridge 40 as follows. Unfiltered water fills peripheral annular channel 62 in top 52 and then into notch 64 from which it flows upwardly through cylindrical portion 72 of lower plate 70. Those skilled in the art will recognize that channel 62 and notch 64 could take on a variety of other shapes to provide fluid communication between the periphery of top 52 and the semi-circular portion of notch 64. For example, channel 62 could extend across top 52 to reach notch 64, and channel 62 need not necessarily be open but could pass through top 52 under the surface. Further, annular channel 62 need not extend entirely around the periphery of top 52 and could have an enclosing outer wall. Notch 64 preferably has a semi-circular shape to provide optimal fluid communication with cylindrical portion 72 of lower plate 70. The remaining flow passage portion of notch 64 connects the semi-circular portion with annular channel 62 in the preferred embodiment and could be shaped in a variety of ways to suit this purpose.

Figure 9:
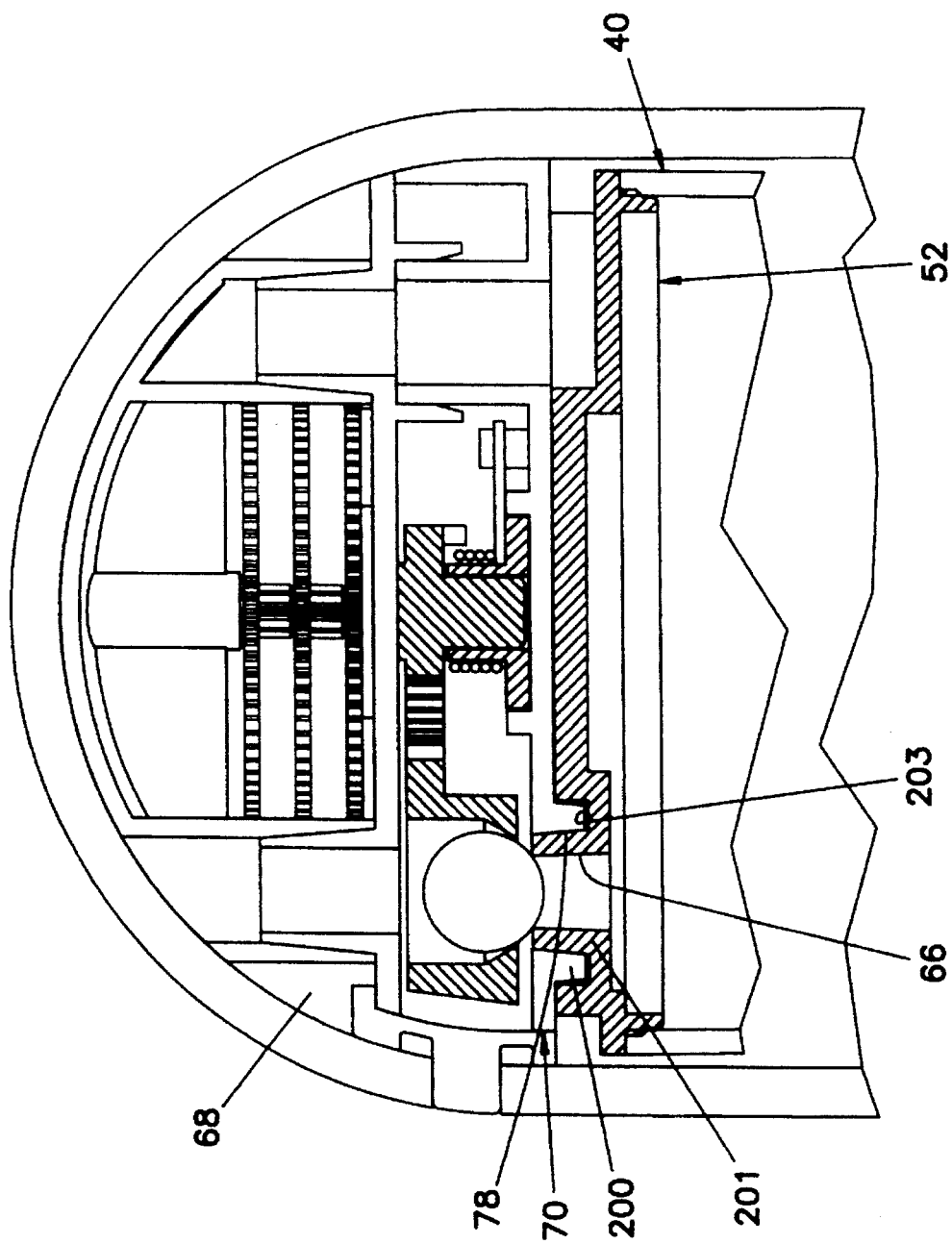
FIG. 9 is a partial cross-sectional view of a second embodiment of a water treatment device and replacement filter cartridge according to the present invention, having improved sealing between the water treatment device and the inlet opening of the replacement filter cartridge.

Referring now to FIG. 9, a second embodiment having improved mating between top 52 of cartridge 40 and lower plate 70, which encloses chamber 68, is shown. Ideally, all of the water entering inlet opening 66 of cartridge 40 should come from chamber 68. Otherwise water leaking from between lower plate 70 and cartridge top 52 into chamber 68 will have bypassed the flow totalization mechanism 130 causing totalization inaccuracies (i.e., under-totalization) relative to the volume of water actually filtered. Therefore, the preferred design includes a structure which provides better sealing between lower plate 70 and inlet opening 66 of filter cartridge 40. In the preferred design, lower plate 70 includes an annular wall 200 which extends toward top 52 of cartridge 40. A corresponding second annular wall 201 extends into opening 78 of lower plate 70, with the outer diameter of second annular wall 201 providing a friction fit with the inner diameter of first annular wall 200. Annular walls 200, 201 are preferably tapered for mating engagement to provide better sealing. First annular wall 200 of top 52 extends into annular channel 203 formed in top 52 and surrounding second annular wall 201. This permits contact between annular walls 200, 201 along an increased distance as well as provides a positive indication of mating between lower plate 70 and top 52 of cartridge 40.

It should be understood that the present invention is not limited to the preferred embodiment discussed above, which is illustrative only. Changes may be made in detail, especially matters of shape, size, arrangement of parts, or material of components within the principles of the invention to the full extent indicated by the broad general meanings of the terms in which the appended claims are expressed.

What is claimed is:

1. A water filter cartridge for use in a water treatment device having a mechanical totalization mechanism, a mechanical shut-off valve mechanism which stops the flow of water after a predetermined volume of water has been filtered, and a flow totalization reset mechanism, the water filter cartridge comprising:

(a) an outer shell containing water treatment material and having a central axis;

(b) an inlet opening proximate a first end and an outlet opening proximate a second end of said outer shell;

(c) a cam extending axially from said first end of said outer shell, said cam being constructed and arranged such that, when the filter cartridge is inserted into or withdrawn from the water treatment device substantially along said central axis, said cam mechanically actuates resetting of the mechanical flow totalization and mechanical shut-off valve mechanisms.

2. A water filter cartridge as defined in claim 1, wherein said cam includes a double sloping facade facing substantially radially inward toward said central axis, said facade actuating said flow totalization reset mechanism upon axial insertion or withdrawal of said filter cartridge.

3. A water filter cartridge as defined in claim 1, wherein said shell includes a separate top which defines said first end and includes said inlet opening and said axially extending cam.

4. A water filter cartridge as defined in claim 1, wherein said cam and said inlet opening are radially displaced from said central axis along respective radial lines and said radial lines are approximately 90° apart relative to one another.

5. A water filter cartridge for use in a water treatment device having a mechanical totalization mechanism, a mechanical shut-off valve mechanism which stops the flow of water after a predetermined volume of water has been filtered, and a flow totalization reset mechanism, the water filter cartridge comprising an outer shell containing water treatment material and having a longitudinal axis, an inlet opening, an outlet opening, and an actuating projection extending from said outer shell substantially parallel to said longitudinal axis of said outer shell, said actuating projection being constructed and arranged such that, when the filter cartridge is inserted into or withdrawn from the water treatment device, said actuating projection mechanically resets the mechanical flow totalization and mechanical shut-off valve mechanisms.

6. A water filter cartridge for use in a water treatment device having a mechanical totalization mechanism, a mechanical shut-off valve mechanism which stops the flow of water after a predetermined volume of water has been filtered, and a flow totalization reset mechanism, the water filter cartridge comprising:

(a) an outer shell containing water treatment material and having a central axis;

(b) an inlet opening proximate a first end and an outlet opening proximate a second end of said outer shell; and (c) a cam extending axially from said first end of said outer shell, said cam being constructed and arranged such that, when the filter cartridge is inserted into or withdrawn from the water treatment device substantially along said central axis, said cam mechanically actuates resetting of the mechanical flow totalization and mechanical shut-off valve mechanisms;

(d) said cam having first and second sloped surfaces forming an apex, said first sloped surface being constructed and arranged to mechanically actuate resetting upon insertion of the filter cartridge, and said second sloped surface being constructed and arranged to mechanically actuate resetting upon withdrawal of the filter cartridge.

7. A water filter cartridge as defined in claim 6, wherein said first and second sloped surfaces are substantially symmetric about said apex.

* * * * *